United States Patent [19]

Araki et al.

[11] 4,367,543

[45] Jan. 4, 1983

[54] OPTICAL DISC PLAYER SIGNAL READING DEVICE WITH IMPROVED DRIVE STRUCTURE FOR MOVING OPTICAL PICKUP IN ORTHOGONAL DIRECTIONS

[75] Inventors: Yositsuga Araki; Toshihikom Kurihara, both of Tokorozawa, Japan

[73] Assignee: Universal Pioneer Corporation, Tokyo, Japan

[21] Appl. No.: 171,071

[22] Filed: Jul. 22, 1980

[30] Foreign Application Priority Data

| Jul. 24, 1979 | [JP] | Japan | 54-93161 |
| Aug. 31, 1979 | [JP] | Japan | 54-110243 |
| Aug. 17, 1979 | [JP] | Japan | 54-113095[U] |
| Dec. 21, 1979 | [JP] | Japan | 54-176205[U] |
| Dec. 21, 1979 | [JP] | Japan | 54-176206[U] |

[51] Int. Cl.³ .......................... G01J 1/20; G11B 7/12
[52] U.S. Cl. ........................................ 369/45; 250/201
[58] Field of Search ............................ 369/44–46, 369/112; 350/46, 78–79, 81–82, 84, 252, 255; 250/201, 202, 570, 234–236, 239; 358/128.5, 128.6

[56] References Cited

U.S. PATENT DOCUMENTS

| 4,092,529 | 5/1978 | Aihara | 369/44 |
| 4,100,405 | 7/1978 | Kondrollochis | 250/202 |
| 4,135,083 | 1/1979 | Van Alem et al. | 369/45 |
| 4,135,206 | 1/1979 | Kleuters et al. | 369/45 |

FOREIGN PATENT DOCUMENTS

| 53-146611 | 11/1979 | Japan | 369/44 |
| 54-146612 | 11/1979 | Japan | 369/44 |

Primary Examiner—Raymond F. Cardillo, Jr.
Attorney, Agent, or Firm—Sughrue, Mion, Zinn, Macpeak & Seas

[57] ABSTRACT

An optical player signal reading device in which a supporting member having inner and outer cylinders pivotally supports an optical pickup. One of the inner and outer cylinders is made of an elastic material or, alternatively, an elastic piece is disposed between the inner and outer cylinder. The pickup is pivoted by a pair of tracking-direction drive sections disposed above and below the supporting member with the elastic component of the supporting member acting as a fulcrum. A focus-direction drive section moves the pickup in the focusing direction.

13 Claims, 13 Drawing Figures

OPTICAL DISC PLAYER SIGNAL READING DEVICE WITH IMPROVED DRIVE STRUCTURE FOR MOVING OPTICAL PICKUP IN ORTHOGONAL DIRECTIONS

BACKGROUND OF THE INVENTION

The present invention relates to an optical disc player signal reading device in which the optical pickup, for instance, a semiconductor laser pickup of an optical video disc player, is movably supported in both the focusing direction and in the tracking or tangential direction.

Heretofore, in order to read information from pits formed on the surface of a video disc in an optical video disc player, it was necessary that the beam spot be controlled so as to be focused on each pit on the video disc as it is rotated and that the beam spot be applied accurately to the pits so that signals can be accurately read from light reflected by the pits. In order to satisfy this requirement, it is necessary to support the pickup in such a manner that the pickup is movable both in the focusing direction or vertically and in the tracking or tangential direction or horizontally.

A conventional pickup supporting technique as shown in FIG. 1 includes a pickup A suspended by a corrugated damper B. This technique is disadvantageous in the following points. Since the damper B is deformable in the focusing direction, when it is required to move the pickup A in the tracking or tangential direction, it is difficult to smoothly move it in the tracking or tangential direction. Furthermore, the fact that the damper is deformable in the focusing direction adversely influences the movement in the focusing direction. In addition, parasitic resonance occurring in the damper B itself adversely affects the movement of the pickup A. Because of the position of the drive point with respect to the pickup A and the relation between the drive point and the fulcrum, the pickup cannot smoothly move in the tracking or tangential direction and the pickup A has a tendency to oscillate linearly in the direction of the drive force. The movement of the supporting point of the pickup A is undesirable in that it results in a twisting of the pickup A. Because of these difficulties, the signal reading accuracy utilizing the conventional technique is low. If the size of the pickup is small and it is impossible to mount the pickup at a suitable mounting position because of the positional relationships of the video disc and other devices, the aforementioned abnormal linear oscillation may occur at a frequency within the frequency band of the signals being processed and therefore the pickup may be unusable as a practical matter.

Yet further, a neutral point which is established when the damper B oscillates in the focusing direction or in the tracking or tangential direction may be expected to vary greatly over a period of time. Also, the reliability of the damper as to its strength is regarded as being insufficient.

SUMMARY OF THE INVENTION

In view of the foregoing, a first object of the invention is to provide an optical disc player signal reading device in which an optical pickup is supported in the pole yoke of a magnetic circuit in a focus-direction drive section by the use of a supporting member which has substantially the form of a dual cylinder composed of an inner cylinder and an outer cylinder so that the optical pickup can vibrate accurately as desired both in the focusing direction and in the tracking or tangential direction. The inner cylinder and outer cylinder may both be rigid and joined by an elastic coupling piece or either of the cylinders may be made of an elastic material.

Another object of the invention is to provide an optical disc player signal reading device in which tracking (or tangential)-direction drive sections are provided respectively above and below the fulcrum of an optical pickup so that parasitic oscillations which otherwise may be generated during the movement of the optical pickup in the focusing direction are eliminated by a couple occurring in the pickup.

The invention further relates to a structure for limiting the directions of vibration of the pickup.

Because it is necessary to move the pickup in its entirety vertically or the focusing direction with respect to the video disc and horizontally or the tracking or tangential direction, it is necessary to provide sliding guide means or supporting means for both of directions. Also, it is required to restrain the movement of the pickup in the other directions.

Accordingly, a further object of the invention is met by a structure in which a plate forming a part of a magnetic circuit serves also as a sliding guide in the tracking or tangential direction and a bobbin provided with a drive coil is also guided by the guide means whereby the movement of the pickup in the tracking or tangential direction and in the focusing direction are properly controlled.

DESCRIPTION OF THE PREFERRED EMBODIMENTS

A first preferred embodiment of the invention will be described with reference to FIGS. 2 and 3.

Figure 1:
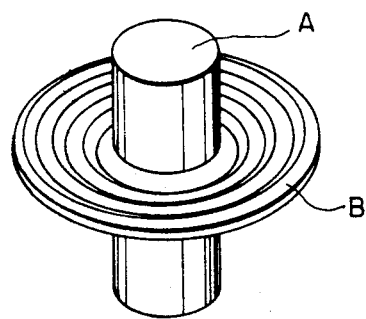
FIG. 1 is a perspective view illustrating a conventional technique for supporting a video disc player signal reading device.
Figure 2:
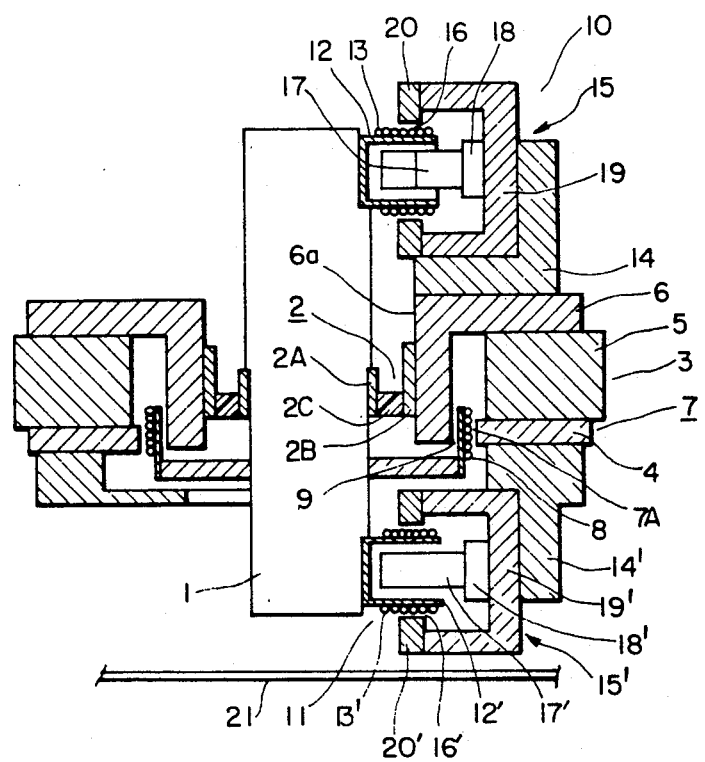
FIG. 2 is a cross-sectional view showing a first preferred embodiment of a signal reading device of the invention.
Figure 3:
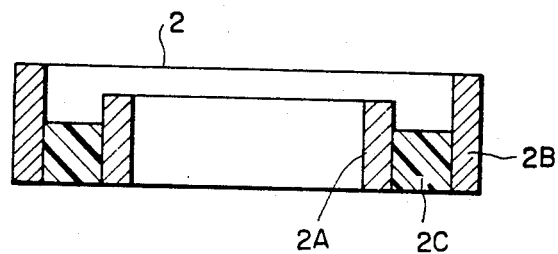
FIG. 3 is also a cross-sectional view showing an example of a supporting member which is a part of the embodiment shown in FIG. 2.

As shown in FIG. 2, a semiconductor laser pickup 1 as an optical pickup is supported by a supporting member 2 which has substantially the form of a dual cylinder. More specifically, the supporting member 2 is constituted by an inner cylinder 2A and an outer cylinder 2B which are made of a metal such as aluminum and are coupled together by a coupling piece 2C made of an elastic material such as rubber and which extend in the vertical direction. It is preferred that at least one of the inner cylinder 2A and outer cylinder 2B be formed of a nonmagnetic material such as aluminum to prevent leakage of magnetic flux form the magnetic circuit 7 in a focus-direction drive section 3. The assembly of the semiconductor laser pickup 1 and the supporting member 2 is supported in a guide hole 6a which is formed in the pole yoke 6 of a drive section 3 (hereinafter referred to as "a focus-direction drive section 3" when applicable) which is adapted to move the semiconductor laser pickup 1 in the focusing direction or vertically only. The focus-direction drive section 3 includes a magnetic circuit 7 constituted by a plate 4, a magnet 5 and the pole yoke 6 and an electromagnetic coil 8 disposed in the magnetic gap 7A of the magnetic circuit 7. The electromagnetic coil 8 is wound on a bobbin 9 which is secured to the semiconductor laser pickup 1.

Figure 9:
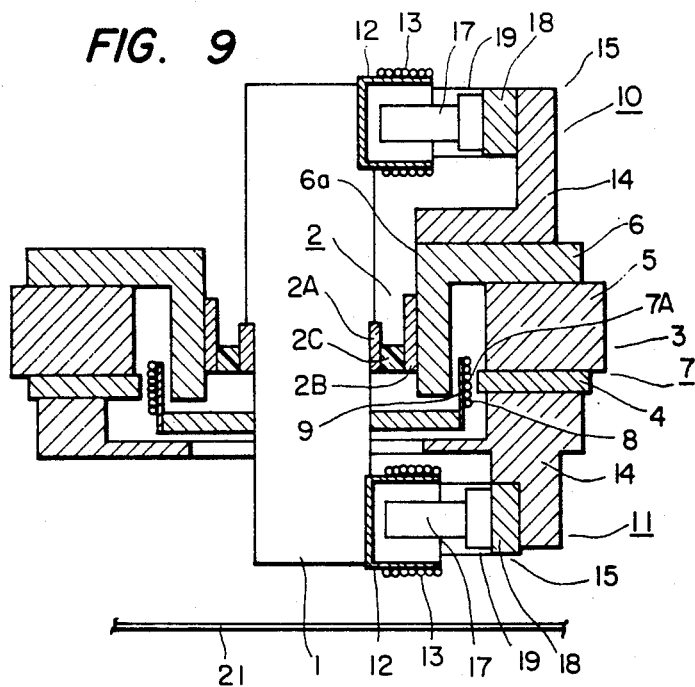
FIG. 9 is a cross-sectional view showing a preferred arrangement of drive coil structure used with the invention.
Figure 10:
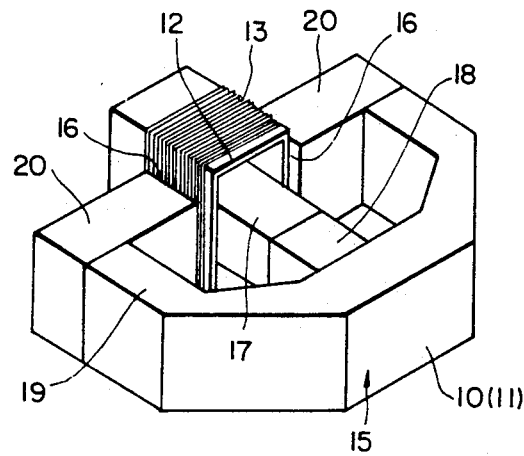
FIG. 10 is a perspective view of a drive section shown in FIG. 9.

In FIG. 2, reference numerals 10 and 11 designate tracking-direction drive sections adapted to move the semiconductor laser pickup 1 in the tracking direction only or horizontally as viewed in FIG. 2. The tracking-direction drive sections 10 and 11 are respectively provided on the upper and lower end portions of the semiconductor laser pickup 1. More specifically, the drive sections 10 and 11 are formed by inserting electromagnetic coils 13 and 13' wound on bobbins 12 and 12', which are preferably rectangular parallelopipeds in shape, secured respectively to the upper and lower end portions of the semiconductor laser pickup 1 into the magnetic gaps 16 and 16' of the magnetic circuits 15 and 15' which are provided above and below the focus-direction drive section 3 through insulators 14 and 14'. The magnetic circuits 15 and 15' (shown here turned by 90 degrees for simplification in illustration) have pole pieces 17 and 17', magnets 18 and 18', yokes 19 and 19' and plates 20 and 20'. In FIG. 2, reference numeral 21 designates a video disc. A preferred structure of the magnetic circuits will be described below with reference to FIGS. 9 and 10.

In operation, when current is applied to the electromagnetic coil 8 of the focus-direction drive section, the electromagnetic coil 8 disposed in the magnetic gap 7A of the magnetic circuit 7 is urged to move vertically as viewed in FIG. 2 and while it is moving the outer cylinder 2B of the supporting member 2 slides along the inner surface of the pole yoke 6 in the guide hole 6a. That is, the semiconductor laser pickup 1 supported in the inner cylinder 2A of the supporting member 2 is moved vertically to thereby control the focusing of the beam spot applied to the disc 21.

When current is applied to the electromagnetic coils 13 and 13' of the tracking-direction drive sections 10 and 11, the electromagnetic coils 13 and 13' are urged by the magnetic flux of the magnetic circuits 15 and 15' to move in a direction perpendicular to the direction of the magnetic flux as a result of which the semiconductor laser pickup 1 is pivoted through the elastic material with the pivot line in the elastic material being relatively close to the inner cylinder 2A. That is, a couple occurs in the semiconductor laser pickup 1 with the supporting member 2 as a fulcrum. Accordingly, the semiconductor laser pickup 1 supported by the supporting member 2 is moved in the tracking direction smoothly without causing parastic resonance to occur with the supporting member. As a result, signals may be correctly read from pits in the disc 21.

Figure 4:
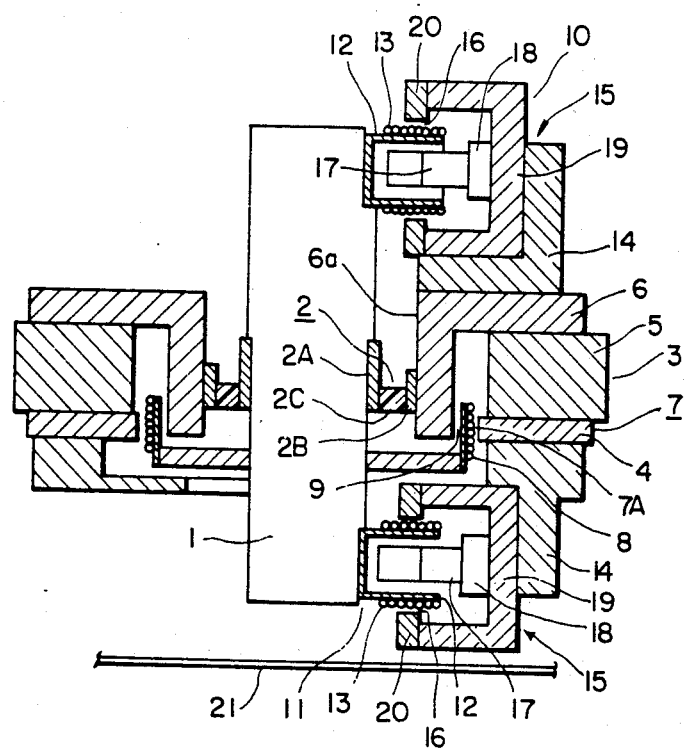
FIG. 4 is a cross-sectional view of a second embodiment of a signal reading device of the invention.
Figure 5:
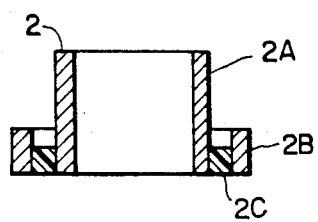
FIG. 5 is a cross-sectional view of a supporting member used in the embodiment of FIG. 4.

If desired, the supporting member 2 can be constructed with the inner cylinder 2A longer in the axial direction of the pickup 1 than the outer cylinder 2B as shown in FIGS. 4 and 5. In that case, the pivot line or fulcrum in the elastic material is nearer the outer cylinder 2B.

As is apparent from the above description, in accordance with the invention, the semiconductor laser pickup 1 is supported in the pole yoke of the magnetic circuit of the focus-direction drive section by a supporting member which has substantially the form of a dual cylinder. Therefore, the semiconductor laser pickup can be precisely moved both in the focusing direction and in the tracking direction. Furthermore, according to the invention, the tracking-direction drive sections are placed respectively above and below of the fulcrum of the semiconductor laser pickup. Therefore, parasitic oscillation which might otherwise be generated when the semiconductor laser pickup is moved in the focusing direction is eliminated by the couple which is caused in the semiconductor laser pickup.

Another embodiment of supporting member 2 is shown in FIGS. 4 and 5. The arrangement of supporting member 2 in this embodiment is similar to that of the above-described embodiments except that outer cylinder 2B is secured to the inner wall surface of the pole yoke 6. Upon application of current to the drive coil 8 in the magnetic gap 7A of the magnetic circuit 7, the drive coil 8 is urged to move vertically. As a result, the semiconductor laser pickup 1 supported slidably by the inner cylinder 2A of the supporting member 2 is moved in the focusing direction along the inner cylinder 2A coupled to the pole yoke 6 through the coupling piece 2C which is made of an elastic material such as rubber whereby the focusing of the beam spot applied to the disc is controlled.

Similar to the first embodiment described above, upon application of current to the drive coils 13 of the tracking-direction drive sections 10 and 11, the magnetic flux produced by the magnetic circuits 15 urges the drive coils 13 to move in a direction perpendicular to the direction of the magnetic flux as a result of which the semiconductor laser pickup 1 is pivoted with the pivot line or fulcrum in the elastic material being most closely adjacent the inner cylinder 2A.

Figure 6:
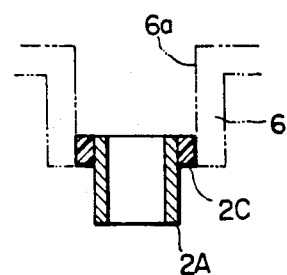
FIG. 6 is a cross-sectional view of another supporting member which can be used with the embodiment of FIG. 2 or 4.

Shown in FIG. 6 is a modification of the supporting member 2 which may be used in the above-described embodiments. In this modification, the outer cylinder 2B is not employed and the coupling piece 2C is secured directly to the inner wall surface of the pole yoke 6.

Another embodiment of the invention will be described with reference to FIGS. 7 and 8.

Figure 8:
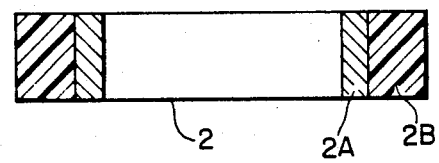
FIG. 8 is a cross-sectional view of a supporting member used in the embodiment of FIG. 7.
Figure 7:
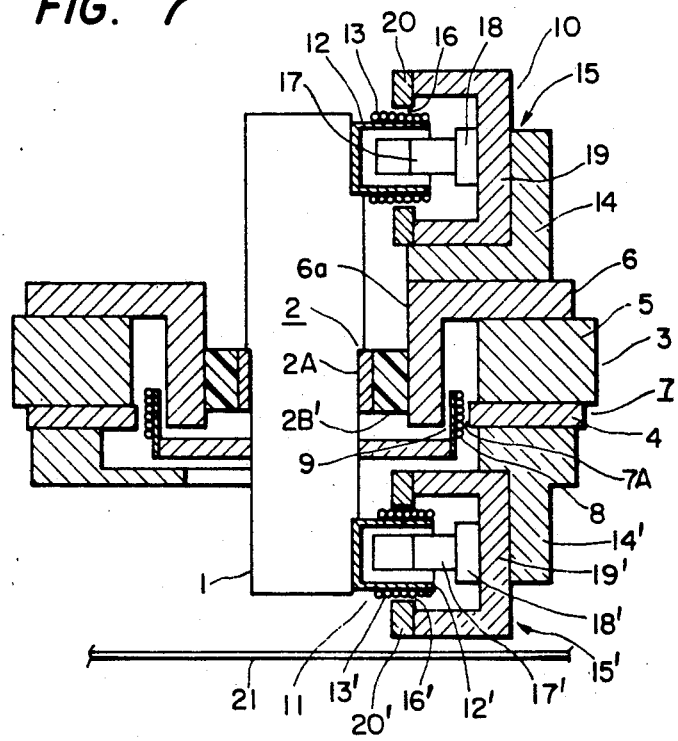
FIG. 7 is a cross-sectional view of a third embodiment of the invention.

In FIGS. 7 and 8, like reference numerals designate like components with respect to the previously described embodiments. The supporting member 2 here is substantially in the form of a dual cylinder constituted by an inner cylinder 2A made of a nonmagnetic material such as aluminum and an outer cylinder 2B' made of an elastic material such as rubber which is attched to the inner cylinder 2A. The semiconductor laser pickup 1 is inserted into the inner cylinder 2A of the supporting member 2. The assembly of the pickup 1 and the supporting member 2 is disposed in the guide hole 6a which is formed in the pole yoke 6 of the focus-direction drive section 3 so that the assembly is supported thereby. If the coefficient of friction of the outer cylinder 2B' with respect to the inner wall of the guide hole 6a is great, it is necessary to coat the wall of the guide hole 6a with resin to reduce the coefficient of friction.

In operation, when current is applied to the drive coil 8 of the focus-direction drive section 3, the drive coil 8 is urged to moved vertically as viewed in FIG. 7. Therefore, the semiconductor laser pickup 1 which is inserted through the inner cylinder 2A of the supporting member 2 slides in the focusing direction with the outer wall of the outer cylinder 2B acting as the sliding surface. With this action, the focusing of the beam spot applied to the disc 21 is controlled.

When current is applied to the drive coils 13 and 13' of the tracking-direction drive sections 10 and 11', the drive coils 13 and 13' are urged by the magnetic flux of the magnetic circuits 15 and 15' to move in a direction perpendicular to the direction of the magnetic flux. As a result, the semiconductor laser pickup 1 is moved in the tracking direction with the outer cylinder 2b' acting as its fulcrum. In this operation, a couple occurs in the semiconductor laser pickup 1 with the outer cylinder 2B' of the supporting member 2 acting as the fulcrum. With this construction, the semiconductor laser pickup 1 is moved smoothly in the tracking direction without causing a parasitic resonance to occur with the supporting member 2 to thereby accurately read signals from the pits on the disc 21. Since the outer cylinder 2B of elastic material slides elastically along the inner wall of the guide hole 6a, there is never an air gap between the outer cylinder 2B and the guide hole 6a thereby preventing play of the semiconductor laser pickup 1 which might otherwise result when the pickup 1 is moved vertically As illustrated in their actual preferred positions in FIGS. 9 and 10, the distances between, respectively, the upper surface of the pole 17 and the upper surface of the interior of the bobbin 12 and the lower surface of the pole 17 and the lower surface of the interior of the bobbin 12 are set in correspondence with the maximum distance of movement for focusing, then the tracking-direction drive sections 10 and 11 will not interfere with the normal movement of the pickup in the focusing direction and it is thereby possible to prevent the semiconductor laser pickup 1 from striking the disc 21.

In each of the magnetic circuits 15, the plates 20 confront each other through the pole 17 in a direction perpendicular to the focusing and tracking directions, that is, in the track's tangential direction, to form the magnetic gaps 16. Therefore, the width of each magnetic gap 16 can be decreased to sufficiently increase the magnetic flux density without regard to movement in the focusing direction.

Figure 11:
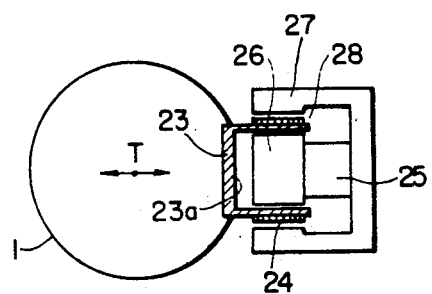
FIGS. 11 and 12 are cross-sectional views.
Figure 12:
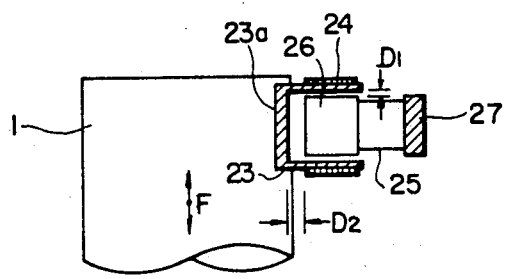
Figure 13:
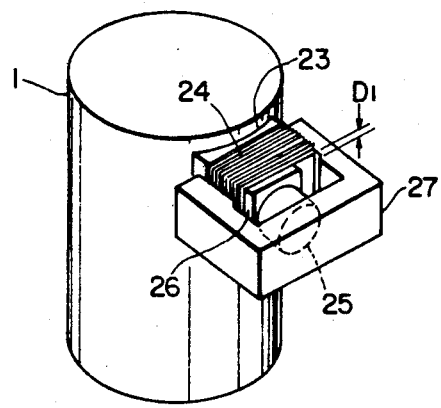
FIG. 13 is a perspective view of another embodiment of a signal reading device of the invention.

Referring now to the embodiment shown in FIGS. 11-13, and optical video disc player signal reading device includes an optical pickup 1, a bobbin 23 in the form of a rectangular parallelopiped which is secured to one side of the optical pickup 1, and a drive coil 24 wound on the bobbin 23. The drive coil 24 is positioned in the magnetic gap 28 which is formed between a U-shaped yoke 27 and a plate 26 to which a magnet 25 is clamped.

The movement of the pickup 1 in the focusing direction is limited by the distance $D_1$ in the focusing direction between the plate 26 and the bobbin 23 while the movement of the pickup 1 in the tracking direction is limited by the distance $D_1$ in the tracking direction between the plate 26 and the bottom 23a of the bobbin 23.

When the pickup 1 is moved in the focusing direction, the distance $D_1$ between the upper surface of the plate 26 and the upper surface of the interior of the bobbin 23 and between the lower surface of the plate 26 and the lower surface of the interior of the bobbin 13 limits the amplitude of the movement in the focusing direction of the pickup 1. Application of a drive current to the drive coil 24 causes the bobbin 23 to slide along the plate 26 as a result of which the pickup 1 is moved in the tracking direction T. In this case, the amplitude of the pickup in the tracking direction T is limited by the distance $D_2$ between the end face of the plate 26 and the bottom 23a of the bobbin 23. There is no excess range of movement during this operation. The side wall of the plate 26 and bobbin 23 serve as sliding member during movement in the tracking direction. Accordingly, it is unnecessary to adjust the relative positions thereof with a high accuracy. Instead, it suffices to manufacture these parts with high dimensional accuracies and therefore the signal reading device of this embodiment of the invention will have a high efficiency. Furthermore, as the amplitudes of movement are relatively small, it is unnecessary to provide for adjustment of the amplitudes.

In the above-described embodiment, the bobbin 23 has the form of a rectangular parallelopiped. However, it may have the shape of a cylinder if desired.

As is apparent from the above description, with this embodiment of the invention, unwanted high amplitudes of movement of the pickup are limited by limiting specific dimensions at portions of the drive device. Accordingly, it is unnecessary to provide for adjustment of the relative positions of any of the drive components. In addition, as the drive components can easily be manufactured with a high accuracy, the signal reading device of the invention is highly efficient. Furthermore, adverse influences due to unwanted amplitude deviations are eliminated.

What is claimed is:

1. An optical disc player signal reading device comprising: an optical pickup; first drive means coupled to move said optical pickup in a first direction perpendicular to a plane of an optical disc being played; second drive means provided on said optical pickup to move said optical pickup in a second direction perpendicular to the first direction; and a supporting member of supporting said pickup, said supporting member comprising first and second cylindrical members at least partially concentric with one another, said supporting member being disposed in a guide hole of said first drive means, one of said first and second cylindrical members comprising elastic material, said optical pickup being pivotable by said second drive means through said one of said cylindrical members.

2. The optical disc player signal reading device of claim 1 wherein said first drive means is a focus-direction drive section for moving said optical pickup in a focusing direction perpendicular to said plane of said optical disc, and wherein said second drive means comprises at least one tracking-direction drive section for moving said optical pickup in a tracking direction parallel to said plane of said optical disc and perpendicular to a track on said optical disc.

3. The optical disc player signal reading device of claim 1 wherein said first drive means is a focus-direction drive section for moving said optical pickup in a focusing direction perpendicular to a plane of an optical disc being played, and wherein said second drive means comprises at least one tangential-direction drive section for moving said optical pickup in a tangential-direction parallel to said plane of said optical disc and parallel to a track on said optical disc.

4. An optical disc player signal reading device comprising:
- an optical pickup;
- a pair of tracking-direction drive sections provided on opposed end portions of said optical pickup for moving said optical pickup in a tracking direction parallel to a plane of an optical disc being played; and
- a supporting member provided between said pair of tracking-direction drive sections and supporting said optical pickup, said supporting member comprising first and second cylindrical members at least partially concentric with one another, one of said cylindrical members comprising elastic material, said pair of tracking-direction drive sections being operable to pivot said optical pickup through said one of said cylindrical members.

5. The optical disc player signal reading device of claim 4 further comprising a focus-direction drive section for moving said optical pickup in a direction perpendicular to said plane of said optical disc including a pole yoke and a guide hole formed in said pole yoke, said supporting member being slidably disposed in said guide hole and securing said optical pickup.

6. The optical disc player signal reading device of claim 4 further comprising a focus-direction drive section including a pole yoke, said supporting member being secured to said pole yoke and slidably supporting said optical pickup.

7. The optical disc player signal reading device of any of claims 1 to 4 wherein said first cylindrical member is disposed adjacent said optical pickup and comprises said elastic material.

8. The optical disc player signal reading device of claim 5 further comprising a third cylindrical member at least partially concentric with said first and second cylindrical members, said first cylindrical member being disposed adjacent said optical pickup, said third cylindrical member being disposed adjacent said pole yoke, said second cylindrical member being disposed between said first and third cylindrical members, said second cylindrical member comprising said elastic material, and said first and third cylindrical members being rigid.

9. The optical disc player signal reading device of any of claims 1 to 4 wherein said second cylindrical member is disposed adjacent said pole yoke and comprises elastic material.

10. The optical disc player signal reading device of any of claims 1 to 4 wherein said first cylindrical member is disposed adjacent said optical pickup and is longer than said second cylindrical member.

11. The optical disc player signal reading device of claim 8 wherein said third cylindrical member is longer than said first cylindrical member.

12. The optical disc player signal reading device of any of claims 1 to 4 wherein said supporting member is made of a nonmagnetic material.

13. A signal reading device for an optical disc player comprising: an optical pickup; a bobbin fixedly secured to a side of said optical pickup; a yoke; a plate disposed between arms of said yoke; a magnet clamped between said plate and said yoke, said bobbin being positioned in a magnetic gap formed between said plate and yoke, dimensions of said gap being determined such that movement in a focusing direction of said pickup perpendicular to a plane of an optical disc being played is limited by a gap in the focusing direction between said plate and said bobbin and movement in a tracking direction of said pickup parallel to said plane of said optical disc is limited by a gap in the tracking direction between an end of said bobbin most closely adjacent said optical disc and said plate; at least one tracking direction drive section provided at an end portion of said optical pickup for moving said optical pickup in a tracking direction parallel to a plane of an optical disc being played and parallel to a track on said optical disc; and a supporting member comprising first and second cylindrical members at least partially concentric with one another, one of said cylindrical members comprising elastic material, said tracking direction drive section being operable to pivot said optical pickup through said one of said cylindrical members.

* * * * *